United States Patent [19]

Dunning et al.

[11] Patent Number: 5,262,240
[45] Date of Patent: Nov. 16, 1993

[54] AGGREGATE TREATMENT

[75] Inventors: Robert L. Dunning, Spokane, Wash.; Gerald O. Schulz, Stow, Ohio

[73] Assignee: The Goodyear Tire & Rubber Company, Akron, Ohio

[21] Appl. No.: 909,514

[22] Filed: Jul. 6, 1992

[51] Int. Cl.$^5$ .............................................. B32B 5/16
[52] U.S. Cl. .................... 428/404; 427/221; 427/242; 427/385.5; 428/407; 524/59; 524/60; 524/62
[58] Field of Search ............... 427/138, 139, 221, 242, 427/385.5; 524/59, 60, 62; 428/404, 407

[56] References Cited

U.S. PATENT DOCUMENTS

| | | | |
|---|---|---|---|
| 4,166,049 | 8/1979 | Huff | 524/62 X |
| 5,023,282 | 6/1991 | Neuhart | 524/59 |
| 5,047,457 | 9/1991 | Higgins | 524/60 |

Primary Examiner—Michael Lusignan
Attorney, Agent, or Firm—Alvin T. Rockhill

[57] ABSTRACT

The subject invention relates to a process for coating aggregate which is particularly useful in making asphalt concrete to provide the aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

20 Claims, No Drawings

AGGREGATE TREATMENT

BACKGROUND OF THE INVENTION

The importance of roads and highways has been appreciated since the time of the Roman Empire. Stone blocks, wood blocks, vitrified brick and natural asphalt (bitumen) has been used to pave roads and highways for centuries. However, at the beginning of the automobile era, must rural roadway surfacing consisted of broken stone or gravel. Such roads were often rough, dusty and clearly inadequate for modern automobile and truck traffic.

Today roads, highways, driveways and parking lots are often paved with asphalt concrete. Pavement can be made with asphalt concretes which are dust-free, smooth, and which offer the strength required for modern automobile and heavy truck traffic. Asphalt concrete is generally made by mixing aggregate (sand and gravel or crushed stone) with the proper quantity of an asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble free. One major problem encountered with asphalt concrete pavements is the loss of the adhesive bond between the aggregate surface and the asphalt cement. This breaking of the adhesive bond between the asphalt cement and the aggregate surface is known as "stripping". The stripping of asphalt binder from aggregate surfaces results in shorter pavement life and many millions of dollars of maintenance work on American highways each year. Reduction of this stripping tendency is of great interest when trying to improve conditions of roads and lowering these maintenance costs.

Stripping is a very complex problem which is dependent upon numerous variables, such as asphalt cement characteristics, aggregate characteristics, weather conditions, traffic conditions, construction practices used, and the use of anti-strip additives. Five different mechanisms by which stripping of asphalt cement from an aggregate surface may occur have been identified by A. R. Tarrer and Vinay Wagh in a Literature Review prepared for the Strategic Highway Research Program, which is titled, "The Effect of the Physical and Chemical Characteristics of the Aggregate on Bonding". These five mechanisms include detachment, spontaneous emulsification, displacement, pore pressure, and hydraulic scoring.

Over the years, various methods have been developed to reduce stripping tendencies. For instance, amines and polyamines are frequently applied to the surface of the aggregate prior to mixing it with the asphalt cement in making asphalt concrete. Amines and polyamines are known to act as anti-stripping agents in such applications. However, the use of amines and polyamines does not totally solve the problem of stripping and their use presents environmental problems. Lime (calcium hydroxide) is also conventionally used to treat aggregate to reduce stripping tendencies. However, the use of lime in such applications does not totally solve the problem of stripping. Additionally, lime is a corrosive material which causes equipment maintenance problems. Lime has also been known to burn the skin of workers using it in such applications.

SUMMARY OF THE INVENTION

It has been unexpectedly found that polydiene rubber latex acts as an excellent anti-strip agent when applied to the surface of aggregate. In addition to providing excellent anti strip characteristics, the use of such latices does not present environmental or safety hazards. In such applications, the latex is applied to the surface of the aggregate and dried prior to mixing the aggregate with the asphalt cement used in making asphalt concrete.

The present invention specifically discloses a process for coating aggregate which is particularly useful in making asphalt concrete to provide the aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

The subject invention also reveals a process for preparing asphalt concrete with comprises: (1) mixing the aggregate with latex to form a latex/aggregate mixture which is comprised of about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate; (4) mixing the coated aggregate with about 3% to about 8% asphalt based upon the total weight of the coated aggregate at a temperature of at least about 107° C.; (5) continuing to mix the coated aggregate with the asphalt to attain an essentially homogeneous asphalt concrete.

DETAILED DESCRIPTION OF THE INVENTION

The latex utilized in coating aggregate in accordance with this invention is the latex of a polydiene rubber. Such polydiene rubbers are comprised of repeat units which are derived from at least one conjugated or non-conjugated diene monomer. Such diene monomers will typically be conjugated diene monomers which contain from about 4 to about 8 carbon atoms, such as 1,3-butadiene or isoprene. Such polydiene rubber can also include repeat units which are derived from other types of monomers which are copolymerizable with the diene monomers. For instance, vinyl aromatic monomers, such as styrene or α-methylstyrene can be copolymerized with diene monomers to prepare rubber latices which are useful in the present invention. For instance, styrene-butadiene rubber (SBR) latex or nitrile rubber (NBR) latex can be employed. For economic reasons, it will typically be preferred to utilize a polybutadiene latex.

The polydiene rubber latex utilized in accordance with this invention can be synthesized using conventional emulsion polymerization techniques. Such emulsion polymerizations generally utilize a charge composition which is comprised of water, one or more diene monomers, optionally additional copolymerizable monomers, an initiator, and an emulsifier (soap). Such polymerizations can be conducted over a very wide temperature range from about 0° C. to as high as about 100° C. Such emulsion polymerizations are typically conducted at a temperature which is within the range of about 5° C. to about 60° C.

The emulsifiers used in such polymerizations may be charged at the outset of the polymerization or may be added incrementally or proportionately as the reaction proceeds. Anionic, cationic or nonionic emulsifiers may be employed. However, sulfonate surfactants have been determined to be highly preferred. This is because hard water is frequently encountered "on site" at asphalt concrete plants. It has been determined that the use of sulfonate surfactants results in much better latices for utilization in such applications where hard water is encountered.

Some representative examples of preferred sulfonate surfactants include: alkane sulfonates, esters and salts, such as alkylchlorosulfonates with the general formula:

RSO$_2$Cl wherein R is an alkyl group having from 1 to 20 carbon atoms, and alkylsulfonates with the general formula:

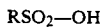

RSO$_2$—OH wherein R is an alkyl group having from 1 to 20 carbon atoms; sulfonates with intermediate linkages such as ester and ester-linked sulfonates such as those having the formula:

RCOOC$_2$H$_4$SO$_3$H and

ROOC—CH$_2$—SO$_3$H wherein R is an alkyl group having from 1 to 20 carbon atoms such as dialkyl sulfosuccinates; ester salts with the general formula:

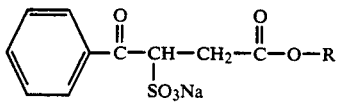

wherein R is an alkyl group having from 1 to 20 carbon atoms, alkarylsulfonates in which the alkyl groups contain preferably from 10 to 20 carbon atoms, e.g., dodecylbenzenesulfonates, such as sodium dodecylbenzenesulfonate; and alkyl phenol sulfonates.

Disulfonated surfactants having the structural formula:

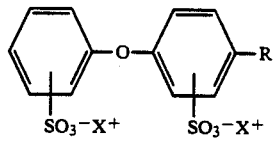

wherein R represents a linear or branched alkyl group containing from about 6 to about 16 carbon atoms and wherein X represents a metal ion, such as a sodium ion, have proven to be excellent surfactants for making the latex used in the practice of this invention. Such surfactants are sold by The Dow Chemical Company as Dowfax TM anionic surfactants.

The emulsion polymerizations used in synthesizing the polydiene rubber latices may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like.

The emulsion polymerization system used in the synthesis of the latex can be treated at the desired degree of conversion with shortstopping agents, such as hydroquinone. Typical stabilizing agents and standard antioxidants can also be added to the latex.

Standard aggregate can be utilized in the practice of this invention. The aggregate is essentially a mixture containing rocks, stones, crushed stone, gravel, and/or sand. The aggregate will typically have a wide distribution of particle sizes ranging from dust to golf ball size. The best particle size distribution varies from application to application. However, the use of diene rubber latices as anti-stripping agents in accordance with this invention is applicable to all aggregate particle size distributions.

The aggregate is coated with the polydiene rubber latex in the first step of carrying out the process of this invention. The latex used will typically have a solids content within the range of about 2% to about 45% (based on weight). It is more typical for the latex to have a solids content within the range of about 5 to about 30 weight percent with it generally being preferred for the latex to have a solids content which is within the range of about 10 weight percent to about 20 weight percent.

The latex can be simply sprayed onto the aggregate. It is, of course, also possible to coat the aggregate with the latex by slurrying it with the latex or by actually dipping it into the latex. The amount of latex applied will be sufficient for the latex/aggregate mixture to contain from about 0.005 weight percent to about 0.5 weight percent dry polymer, based upon the weight of the aggregate. It is preferred for the latex/aggregate mixture to contain from 0.01 to 0.2 weight percent polymer and is more preferred for it to contain from 0.05 to 0.1 weight percent polymer. In any case, after the latex is thoroughly applied to the aggregate, the aggregate will be dried to a moisture content which is below about 0.7 weight percent. This can be accomplished by heating the aggregate to an elevated temperature. The aggregate will typically be heated to a temperature which is within the range of about 150° F. (66° C.) to about 450° F. (232° C.). It is typically preferred to heat the aggregate to a temperature which is within the range of about 200° F. (93° C.) to 400° F. (204° C.). It is generally most preferred to heat the aggregate to a temperature which is within the range of about 300° F. (149° C.) to about 350° F. (177° C.). As the water in the latex evaporates, a polymer film forms and crosslinks on the surface of the aggregate to produce a coated aggregate surface.

The coated aggregate can be dried utilizing standard equipment which is used in plants which are designed to make asphalt concrete. For instance, the aggregate which has been coated with latex can be dried in a conventional drying drum or in a conventional drum mixer. After the aggregate has been dried, it is then mixed with an appropriate amount of asphalt cement. As a general rule, from about 3 weight percent to about 8 weight percent of the asphalt will be mixed with the coated aggregates, based upon the total weight of the coated aggregates. It is more typical for from about 5 weight percent to about 6 weight percent of the asphalt to be added to the coated aggregate, based upon the total weight of the coated aggregate.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark colored (solid, semi-solid or viscous) cementitious substances, natural or manufactured, composed principally of high molecular weight hydrocarbons, of which asphalts, tars, pitches, asphaltites are typical. ASTM further classifies asphalts or bituminous materials as solids, semi-solids, or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter), and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range. Table I below shows the ASTM grading system for AC-2.5, AC-5, AC-10, AC-20 and AC-40.

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. The asphalt cements that may be used in the present invention have an ASTM grade of AC-2.5, AC-5, AC-10, AC-20 and AC-40. The preferred asphalt cements include AC-5, AC-10 and AC-20 with AC-5 and AC-10 being the most preferred grades.

The coated aggregate is mixed with the asphalt to attain an essentially homogeneous asphalt concrete. The coated aggregate is mixed with the asphalt cement utilizing conventional techniques and standard equipment. For instance, the coated aggregate can be dried and mixed with asphalt to produce asphalt concrete on a continuous basis in a standard mixer.

The asphalt concrete made by the process of this invention can then be used to pave roads, highways, exit ramps, streets, driveways, parking lots, airport runways, or airport taxiways utilizing conventional procedures. However, pavements made utilizing the asphalt concretes of this invention are far less susceptible to stripping than conventional asphalt concrete surfaces. Additionally, such asphalt concrete pavements are believed to be less susceptible to oxidative degradation. This is because the rubber coating on the aggregate prevents oxidative degradation of the asphalt which is normally catalyzed by the aggregate.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

A polybutadiene latex was prepared for utilization in coating aggregate. The latex was prepared in a 10 gallon (37.9 liter) reactor. The reactor was equipped with two 6 inch (15.24 cm) axial flow turbines with baffles.

A soap solution/buffer charge was prepared by mixing 27.8 lbs. (12.16 kg) of water, 0.4 lbs. (0.18 kg) of Aerosol TM A-196 (85% active), 0.44 lbs. (0.20 kg) of Dowfax TM XD 8390 (35% active), 0.04 lbs. (0.018 kg) of ammonium sulfate, 0.03 lbs. (0.014 kg) of a 3% aqueous solution of ferric sulfate heptahydrate, 0.024 lbs. (0.011 kg) of sodium formaldehyde sulfoxylate, and 2 grams of sodium hydrosulfite (an oxygen scavenger) to a mixing vessel. The pH of the soap solution was determined to be within the range of 6 to 7. Then 0.034 lbs. (0.015 kg) of t-dodecylercaptan was charged into the mixing vessel. The contents of the mixing vessel were then drawn into the reactor by vacuum. The reactor was then degassed with vacuum and flushed with nitrogen several times to eliminate any oxygen.

The temperature of the reactor was set to 70° F. (21.1° C.) and 20 lbs. (9.07 kg) of 1,3-butadiene monomer was charged directly into the reactor. At that point, 0.1 lbs. (0.045 kg) of α-pinene hydroperoxide (40% active) was charged directly into the reactor with agitation being provided at 150 rpm. After about 10 hours of polymerization time, an additional charge containing 0.05 lbs. (0.023 kg) of α-pinene hydroperoxide (40% active) and 0.01 lbs. (0.004 kg) of sodium formaldehyde sulfoxylate was charged into the reactor to maintain polymerization rates. After the solids content reached about 31% (after about 16 hours of polymerization time), a shortstop solution was introduced into the reactor. The shortstop solution contained 0.02 lbs. (0.009 kg) of N,N-diethyldithiocarbamate, 0.01 lbs. (0.005 kg) of N,N-diethylhydroxylamine, and 1.6 lbs. (0.73 kg) of water. Residual butadiene monomer was then removed from the reaction vessel. The latex was then filtered and its pH was adjusted with ammonium hydroxide to be within the range of 7.5 to 8.0.

The polybutadiene latex made was then used to coat aggregate. In the procedure utilized, a standard drum mixer having a capacity of 100,000 tons per hour was employed, although it was operated at a rate of about 60,000 tons per hour. The latex was sprayed onto the aggregate as it dropped onto a belt which introduced the aggregate into the drum mixer. The spray nozzles used in applying the polybutadiene latex to the aggregate were Tee-Jet ™ 8015 nozzles. The spray rate was controlled by adjusting the pressure of the pump used to force the polybutadiene latex through the nozzles. Upon entering the drum mixer, the wet aggregate was heated to a temperature of about 150° C. This dried the aggregate to a moisture content of less than 0.7 weight percent to produce a coated aggregate. This drying procedure caused the polybutadiene to crosslink (gel) on the surface of the aggregate. The drum mixer was operated in a standard manner with the asphalt cement being mixed with the aggregate in it about half way down. After this mixing was accomplished, a asphalt concrete exited the drum mixer at a temperature of about 150° C.

The hot asphalt concrete was then transported to a job site where it was applied as a pavement. The asphalt concrete proved to be entirely satisfactory for this purpose and was capable of being laid down in a conventional manner. Representative test samples of the asphalt concrete were taken and tested.

The asphalt concrete was evaluated utilizing the Texas Boil Test and a Modified Lottman Procedure. The Texas Boil Test consists of boiling a asphalt concrete sample in water for 10 minutes. It is a severe test used for rapid visual determination of the effectiveness of anti-stripping systems. The asphalt concrete samples made utilizing aggregate which had been coated with the polybutadiene latex exhibited a high degree of resistance to stripping. The aggregate used in this trial is known to be very susceptible to stripping. In fact, without an anti-stripping agent or lime, this particular aggregate loses most of its asphalt in the Texas Boil Test. In fact, untreated aggregate was shown to retain only 5 to 10 percent of the asphalt cement after being subjected to the Texas Boil Test. However, the polybutadiene coated aggregate retained most of the asphalt cement after being subjected to the Texas Boil Test. At higher application levels of the latex coating, higher protection against stripping was realized. Table I shows the relationship between the amount of polybutadiene rubber applied to the aggregate and the amount of asphalt retained after completion of the Texas Boil Test.

TABLE I

| % Polybutadiene Applied to Aggregate* | % Asphalt Retained |
|---|---|
| 0 (Control) | 5-10 |
| 0.05 | 70-80 |
| 0.10 | 85-95 |
| 0.15 | 95-100 |
| 0.25 | 100 |
| 0.50 | 100 |

*Dry weight based on the weight of the aggregate

Table I shows that good resistance to stripping is realized when only 0.05 weight percent of the polybutadiene is applied to the aggregate. At higher levels, even better resistance to stripping can be attained. At levels of greater than 0.25 percent, 100 percent of the asphalt cement was retained after completion of the Texas Boil Test. This example accordingly shows that the use of polybutadiene latex to treat aggregate provides outstanding anti-strip characteristics. This example also shows that the procedure of this invention can be implemented at a commercial scale because the coated aggregate was able to withstand the harsh conditions of the heated drum mixer. Additional studies also showed that the latex coated aggregate did not present emission problems at the hot mix plant.

The asphalt concrete made was also tested by an Immersion-Compression test (ASTM D-1074 and D-1075) which is used by the Federal Highway Administration and proved to be satisfactory. Asphalt concrete samples were prepared using ASTM D-1561 for testing by a Modified Lottman Procedure. The Modified Lottman Procedure used is employed by the Washington State Department of Transportation (Washington State DOT Test No. 718). The Lottman Procedure used evaluates interfacial bond strength between the asphalt and aggregate in the presence of water and cyclic stresses. The asphalt concrete samples evaluated also proved to meet or surpass the standards of the Lottman Procedure. The results of the Lottman Stripping test are shown in Table II.

TABLE II

| Sample | Retained Strength at 77° C. (25° C.) | Visual Observation |
|---|---|---|
| Control | 65% | Badly stripped |
| Aggregate coated with 0.038% rubber | 78% | Some stripping |
| Aggregate coated with 0.077% rubber | 106% | Moderate stripping |
| Aggregate coated with 0.093% rubber | 106% | Very slightly stripped |

By utilizing the process of this invention, another extremely important but unexpected benefit was realized in that the viscosity of the recovered asphalt was enhanced. In fact, the viscosity of the recovered asphalt was 5143 poise which was more than twice as great as that of the control (2026 poise) at 140° F. (60° C.). The resilient modulus test at 140° C. (60° C.) as conducted in the Lottman Procedure showed that the modulus of the asphalt concrete (17,300 psi) was almost double that of the control (9800 psi). It can be concluded from this example that there is a positive effect of viscosity enhancement of the asphalt binder when using a rubber latex anti-strip system, thus offering an improvement in temperature susceptibility.

While certain representative embodiments and details have been shown for the purpose of illustrating the subject invention, it will be apparent to those skilled in this art that various changes and modifications can be made therein without departing from the scope of the subject invention.

What is claimed is:

1. A process for coating aggregate which is particularly useful in making asphalt concrete to provide the aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; and (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

2. A process as specified in claim 1 wherein the latex contains a sulfonate surfactant.

3. A process as specified in claim 1 wherein the latex is a polydiene rubber latex.

4. A process as specified in claim 1 wherein the latex is a styrene-butadiene rubber latex.

5. A process as specified in claim 1 wherein the latex is a polybutadiene rubber latex.

6. A process as specified in claim 3 wherein the latex/aggregate mixture prepared in step (1) contains from about 0.01 weight percent to about 0.2 weight percent dry polymer.

7. A process as specified in claim 6 wherein the latex has a solids content which is within the range of about 2 weight percent to about 45 weight percent.

8. A process as specified in claim 7 wherein the latex/aggregate mixture is heated to a temperature which is within the range of about 93° C. to about 204° C.

9. A process as specified in claim 5 wherein the latex/aggregate mixture prepared in step (1) contains from about 0.05 weight percent to about 0.1 weight percent dry polymer.

10. A process as specified in claim 9 wherein the latex has a solids content which is within the range of about 5 weight percent to about 30 weight percent.

11. A process as specified in claim 10 wherein the latex/aggregate mixture is heated to a temperature which is within the range of about 149° C. to about 177° C.

12. A process as specified in claim 11 wherein the latex has a solids content which is within the range of about 10 weight percent to about 20 weight percent.

13. A process as specified in claim 2 wherein the latex/aggregate mixture is heated in step (2) in a drum mixer.

14. A process as specified in claim 5 wherein the latex contains a di-sulfonated surfactant.

15. The coated aggregate made by the process specified in claim 1.

16. The coated aggregate specified in claim 15 wherein the aggregate is coated with from about 0.05 weight percent to about 0.1 weight percent polybutadiene.

17. A process for preparing asphalt concrete which comprises: (1) mixing an aggregate with latex to form a latex/aggregate mixture which is comprised of about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate; (4) mixing the coated aggregate with about 3% to about 8% asphalt based upon the total weight of the coated aggregate at a temperature of at least about 107° C.; and (5) continuing to mix the coated aggregate with the asphalt to attain an essentially homogeneous asphalt concrete.

18. A process as specified in claim 17 wherein the coated aggregate is mixed with about 5 weight percent to about 6 weight percent of the asphalt, based upon the total weight of the coated aggregate.

19. The asphalt concrete made by the process specified in claim 7.

20. The pavement which is made utilizing the asphalt concrete specified in claim 19.

* * * * *